United States Patent Office 2,851,439
Patented Sept. 9, 1958

2,851,439
SILOXANE BORATE COMPOSITIONS

Harold A. Clark, Midland, Mich., assignor to Dow Corning Corporation, Midland, Mich., a corporation of Michigan No Drawing. Application March 12, 1956
Serial No. 570,722

4 Claims. (Cl. 260—46.5)

This invention relates to siloxane resin alkyl borate compositions.

A perennial problem that has long plagued the silicone resin industry has been the large amount of run-off of a silicone resin from a coated article while the resin was being cured. This problem has been particularly serious in the dipping varnish field. For example, an electric coil or other article is dipped into a solution of a silicone resin, air dried and then placed in a curing oven to cure. Often times over 50 percent of the resin will drip from the surface of the apparatus before the resin has cured. This run-off collects in the bottom of the oven where it gels and is therefore useless. As a result of this the use of silicone resins in many electrical applications is much more costly than if no resin was wasted.

In the past all attempts to satisfactorily solve this problem have met with failure due to the fact that all additives previously tried either ruin the dielectric strength of the resin or the thermal stability or the flexibility or a combination of these properties. The problem was to find an additive which would stop the run-off without deleteriously affecting any desirable property of the resin.

It was known from U. S. Patent 2,371,068 that a multitude of dehydration catalysts could be employed to cure hydroxylated siloxanes. Among these is included esters of boric acid. However, this patent fails to teach the products of this invention because the critical limitations which are necessary to accomplish the purpose of this invention are missing from said patent. Consequently in spite of the fact that this patent was issued in 1945 the problem of run-off in siloxane resins has only now been satisfactorily solved.

It is the object of this invention to provide novel compositions of matter which will not run off of surfaces while being cured. Another object is to provide siloxane resin compositions which give faster build-up on glass cloth than heretofore obtainable with siloxane resins alone. Other objects and advantages will be apparent from the following description.

This invention relates to compositions of matter comprising (1) a methylphenylpolysiloxane resin having from 1 to 1.7 inclusive total methyl and phenyl groups per silicon atom and from .1 to 1.5 percent by weight silicon bonded hydroxyl groups and (2) from .01 to 3 percent by weight of an alkyl borate based on the weight of the siloxane resin.

The applicant has found that when the above type of resins are mixed with the defined amount of alkyl borate, the resin undergoes a reversible gelation at room temperature when the concentration thereof in a solvent reaches a certain critical limit. The fact that the gelation is reversible (and hence not a true condensation of the type normally encountered with catalytic materials) is shown by the fact that the gel redissolves at room temperature when the siloxane is diluted below the critical concentration. The critical concentration at which this gelation takes place varies with the formulation of the resin, with the degree of polymerization of the resin and with the amount of alkyl borate. In general the higher the phenyl content in the resin, the higher the concentration of resin in the solution at which gelation will occur. Other things being equal, the higher the degree of polymerization of the resin in solution, the lower will be the concentration at which gelation will occur. Other things being equal, the higher the concentration of alkyl borate, the lower the concentration of the resin in the solution at which gelation will occur.

It should be understood that if gelation occurs inadvertently before the resin is used, it can be reversed by merely diluting the solution below the critical concentration. When this occurs the resin will redissolve completely at room temperature and it is again ready for use.

This gelation phenomena indicates why the compositions of this invention do not run off of coated or impregnated articles. The article is coated or impregnated with the resin solution and allowed to air dry. As the solvent evaporates gelation will occur when the critical concentration has been exceeded. The gel is not reversed by heat thus when the resin is cured it does not flow.

It has been found that the alkyl borates themselves do not act as curing catalysts in the commonly accepted sense for the resins of this invention. Thus, unless the resin is one which can be cured in a reasonable time by heat alone, a curing catalyst is needed in order to cure the compositions of this invention. Suitable curing catalysts include carboxylic acid salts such as zinc hexoate, zinc octoate, lead butyrate and cobalt naphthenate; quaternary ammonium compounds such as benzyl trimethyl ammonium butoxide, beta-hydroxyethylbenzyldimethyl ammonium butoxide; amines and any other catalysts commonly employed with siloxane resins.

The siloxane resins employed in the compositions of this invention are copolymers of methyl and phenyl siloxanes. The presence of phenyl siloxanes is necesary because all methyl siloxane resins are deficient in thermal stability. The resins of this invention should have a total of from 1 to 1.7 total methyl and phenyl groups per silicon atom and it is critical that the silicon bonded hydroxyl content of the resin be from .1 to 1.5 percent by weight, preferably from .1 to 1 percent by weight. It has been found that resins containing less than .1 percent by weight hydroxyl will run off when cured. The same is true of resins containing more than 1.5 percent by weight hydroxyl. The explanation for this phenomena is not known but it is evident that the hydroxyl content is critical in order to obtain the results of this invention.

It is preferable that the resins of this invention contain at least 20 mol percent phenylsiloxane. Specific examples of siloxane units which are in the resins of this invention are monomethylsiloxane, dimethylsiloxane, monophenylsiloxane, diphenylsiloxane and phenylmethylsiloxane. The resins may be composed of any combination of these units provided there is some phenyl and some methyl groups in the resin.

For the purpose of this invention the resin composition must contain from .01 to 3 percent by weight of an alkyl borate based on the weight of the siloxane resin. The optimum amount of alkyl borate to be employed with any particular resin composition varies with the composition. For example, with some resin compositions, particularly those of a high degree of polymerization, .1 percent alkyl borate is sufficient for gelation. With other resin compositions the optimum concentration is in the neighborhood of 1 to 2 percent. In all cases the concentration of alkyl borate must not be greater than 3 percent because more than this amount ruins the wet electrical properties of the resins. Furthermore high concentrations of alkyl borate such as, for example, 20 percent or more do not give the gelation phenomena necessary in this invention even with resins within the scope of the invention.

Any alkyl borate such as methyl borate, ethyl borate, butyl borate, amyl borate or octadecyl borate is operative in this invention. These materials are available commercially or may be prepared by the reaction of the corresponding alcohols with boric acid under conditions providing for the removal of water as it is formed.

If desired, the compositions of this invention may be mixed with suitable fillers such as mica, glass, silica, clays or other suitable materials.

Any of the commonly used solvents which are employed with organosilicon resins such as aromatic or aliphatic hydrocarbons, ethers, and alcohols may be employed with the compositions of this invention.

The compositions of this invention are particularly useful in the coating of electrical apparatus and in the preparation of siloxane coated glass cloth.

The following examples are illustrative only and should not be construed as limiting the invention which is properly set forth in the appended claims. The abbreviations Me and Ph are used for methyl and phenyl respectively.

EXAMPLE 1

This example shows the absence of run-off encountered with the compositions of this invention as compared with compositions outside the scope thereof. Runs 1 and 2 show the effect of too little and too much silicon bonded hydroxyl in the siloxane resin.

In each case the resin solution was placed in an aluminum cup and allowed to air dry for 1½ hours. The cup was then inverted and placed in a 150° oven for 1 hour. The amount of resin which dripped from the cup was weighed and the percent by weight of the original sample is given as the run-off. The results are shown in the table below. The percent by weight curing catalyst, hydroxyl and butyl borate are based on the weight of the siloxane resin.

The thermal stability, dielectrical properties and flexibility of all of the resins containing the borate were the same as those of the same resins without the borate. Compositions 3 through 9 were used to impregnate and coat electrical equipment. They all performed satisfactorily for class H materials.

EXAMPLE 2

The composition of run 6 of Example 1 was employed to coat glass cloth as follows. The cloth was dipped into the solution, air dried 30 minutes, and then heated 30 minutes at 110° C. The coated cloth was again dipped in the solution and then cured at 150° C. for 4 hours. The build-up on the cloth in these two dips was 16 to 17 mils. The resin did not run off of the cloth during curing. With the blank run employing no butyl borate but otherwise the same composition as that in 6 there was a build up of 7 to 8 mils on the cloth after two dips and there was considerable run-off upon curing.

EXAMPLE 3

Equivalent results are obtained when methyl borate and amyl borate are substituted for the butyl borate in Example 1.

EXAMPLE 4

A 60 percent by weight toluene solution of a resin having the composition 65 mol percent monomethylsiloxane and 35 mol percent monophenylsiloxane and containing .6 percent by weight silicon bonded hydroxyls, said solution containing 2 percent by weight butyl borate, was tested by the procedure of Example 1. The run-off was zero while in a blank run without borate the run-off was 53 percent.

That which is claimed is:

1. A composition of matter comprising a solution of (1) a methylphenylpolysiloxane resin having from 1 to

*Table I*

| No. | Composition of resin in mol percent | Percent curing catalyst | Percent OH | Percent butyl borate | Concentration of resin in solution in percent by wt. | Percent run-off | Percent run-off of blank |
|---|---|---|---|---|---|---|---|
| 1 | 55% PhMeSiO<br>30% MeSiO$_{1.5}$<br>15% PhSiO$_{1.5}$ | None | 0 | 2 | 50 | 75.3 | |
| 2 | 34.9% PhSiO$_{1.5}$<br>28.9% MeSiO$_{1.5}$<br>26.5% Me$_2$SiO<br>9.7% Ph$_2$SiO | .1 zinc octoate | 2.5 | 2 | 50 | 69.8 | |
| 3 | 34.9% PhSiO$_{1.5}$<br>28.9% MeSiO$_{1.5}$<br>26.5% Me$_2$SiO<br>9.7% Ph$_2$SiO | .1 zinc octoate | .5 | 2 | 50 | 0 | 61.5 |
| 4 | 55% PhMeSiO<br>30% MeSiO$_{1.5}$<br>15% PhSiO$_{1.5}$ | None | .3 | 1 | 50 | 0 | 50.6 |
| 5 | 29.4% PhMeSiO<br>32% MeSiO$_{1.5}$<br>32.6% PhSiO$_{1.5}$<br>6.0% Ph$_2$SiO | .1 zinc octoate | 1 | .2 | 60 | 0 | 53 |
| 6 | 35% PhMeSiO<br>10% Me$_2$SiO<br>25% MeSiO$_{1.5}$<br>30% PhSiO$_{1.5}$ | .1 zinc octoate | .4 | .1 | 37 | 0 | 48.5 |
| 7 | 50.8% PhMeSiO<br>27.8% MeSiO$_{1.5}$<br>13.9% PhSiO$_{1.5}$<br>7.5% Ph$_2$SiO | .1 zinc octoate | .5 | 2 | 50 | 0 | 55.3 |
| 8 | 31.4% PhMeSiO<br>34% MeSiO$_{1.5}$<br>34.6% PhSiO$_{1.5}$ | None | .4 | 2 | 50 | 0 | 28 |
| 9 | 31.4% PhMeSiO<br>34% MeSiO$_{1.5}$<br>34.6% PhSiO$_{1.5}$ | .1 zinc octoate | .4 | 2 | 50 | 0 | 35 |

Blank run-off indicates run-off of identical composition without any butyl borate.

The solvent employed in all runs except 2 and 5 was xylene. In runs 2 and 5 the solvent was toluene. In all cases the critical concentration of the resin for gelation is above the figures shown in the table.

1.7 inclusive total methyl and phenyl groups per silicon atom and from .1 to 1.5 percent by weight silicon bonded OH radicals and (2) from .01 to 3% by weight of an alkyl borate based on the weight of the siloxane resin.

2. A composition in accordance with claim 1 wherein the borate is butyl borate.

3. A composition of matter comprising (1) a solution of a methylphenylpolysiloxane resin having from 1 to 1.7 inclusive total methyl and phenyl groups per silicon atom and from .1 to 1 percent by weight silicon bonded OH radicals and (2) from .01 to 3 percent by weight of an alkyl borate based on the weight of the siloxane resin.

4. A composition in accordance with claim 3 wherein the borate is butyl borate.

References Cited in the file of this patent

UNITED STATES PATENTS 2,371,068     Rochow ---------------- Mar. 6, 1945